(12) United States Patent
Elias et al.

(10) Patent No.: US 8,933,663 B2
(45) Date of Patent: Jan. 13, 2015

(54) METHOD FOR CHARGING A TRACTION BATTERY, DEVICE FOR TRANSMITTING ENERGY TO AN ELECTRIC VEHICLE AND ELECTRIC VEHICLE

(75) Inventors: Björn Elias, Hepberg (DE); Reinhard Peer, Gaimersheim (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/234,082

(22) PCT Filed: Jun. 14, 2012

(86) PCT No.: PCT/EP2012/002530
§ 371 (c)(1),
(2), (4) Date: Jan. 21, 2014

(87) PCT Pub. No.: WO2013/013742
PCT Pub. Date: Jan. 31, 2013

(65) Prior Publication Data
US 2014/0139181 A1 May 22, 2014

(30) Foreign Application Priority Data
Jul. 22, 2011 (DE) .......................... 10 2011 108 386

(51) Int. Cl.
H02J 7/00 (2006.01)
B60L 11/18 (2006.01)

(52) U.S. Cl.
CPC ........... *B60L 11/182* (2013.01); *B01L 11/1811* (2013.01); *B60L 11/1829* (2013.01); *H02L 7/025* (2013.01); *B60L 11/1809* (2013.01); *B60L 2230/14* (2013.01); *Y02T 10/7088* (2013.01); *Y02T 10/7005* (2013.01); *Y02T 90/125* (2013.01); *Y02T 90/14* (2013.01); *Y02T 90/127* (2013.01); *Y02T 90/122* (2013.01)
USPC .......................................... 320/108; 320/109

(58) Field of Classification Search
USPC .................................... 320/108, 109
See application file for complete search history.

(56) References Cited

U.S. PATENT DOCUMENTS

| 5,654,621 | A | 8/1997 | Seelig |
| 6,614,204 | B2 * | 9/2003 | Pellegrino et al. ............ 320/109 |

(Continued)

FOREIGN PATENT DOCUMENTS

| DE | 42 36 286 | 5/1994 |
| DE | 102009001080 | 8/2010 |
| DE | 102009015753 | 10/2010 |
| EP | 0 788 212 | 8/1997 |

(Continued)

OTHER PUBLICATIONS

International Search Report issued by the European Patent Office in International Application PCT/EP2012/002530 on Jul 19, 2013.

*Primary Examiner* — M'Baye Diao
(74) *Attorney, Agent, or Firm* — Henry M. Feiereisen LLC

(57) ABSTRACT

In a device for transmitting energy to the electric vehicle a first rotating disc is provided on a parking space, which turning disc can be rotated about a rotational axis by means of a drive device. Arranged on the rotating disc is a positioning device by means of which an energy output device can be positioned on the first rotating disc, as a result of which a radial distance between the output device and the first rotational axis can be changed.

7 Claims, 3 Drawing Sheets

(56) References Cited

U.S. PATENT DOCUMENTS

| | | |
|---|---|---|
| 8,217,774 B2 | 7/2012 | Elias et al. |
| 2005/0002145 A1 | 1/2005 | Elon |
| 2009/0091101 A1* | 4/2009 | Leonard et al. ............... 280/638 |
| 2010/0117596 A1 | 5/2010 | Cook et al. |
| 2011/0248844 A1 | 10/2011 | Elias et al. |
| 2012/0203410 A1 | 8/2012 | Wechlin et al. |

FOREIGN PATENT DOCUMENTS

| | | |
|---|---|---|
| JP | 04-236102 | 8/1992 |
| JP | 2010-246348 | 10/2010 |
| WO | WO 2011/006884 | 1/2011 |
| WO | WO 2011/045883 | 4/2011 |

* cited by examiner

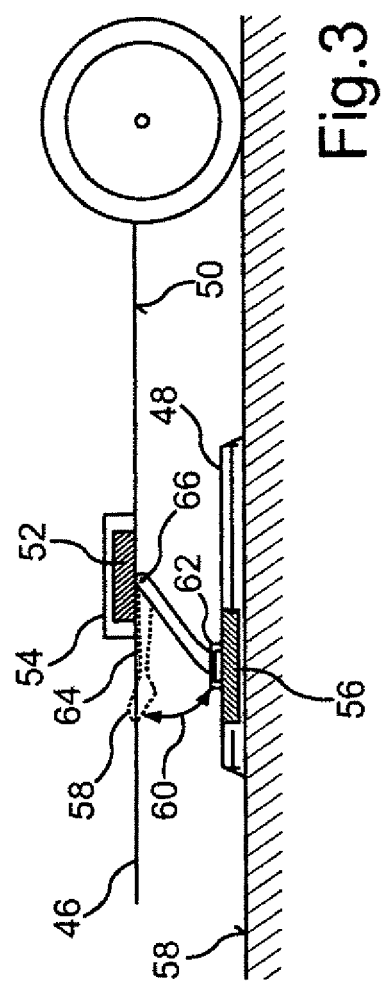

METHOD FOR CHARGING A TRACTION BATTERY, DEVICE FOR TRANSMITTING ENERGY TO AN ELECTRIC VEHICLE AND ELECTRIC VEHICLE

CROSS-REFERENCES TO RELATED APPLICATIONS

This application is the U.S. National Stage of International Application No. PCT/EP2012/002530, filed Jun. 14, 2012, which designated the United States and has been published as International Publication No. WO 2013/013742 and which claims the priority of German Patent Application, Serial No. 10 2011 108 386.7, filed Jul. 22, 2011, pursuant to 35 U.S.C. 119(a)-(d).

BACKGROUND OF THE INVENTION

The invention relates to a method for charging a traction battery of an electrically drivable motor vehicle with energy. The invention also relates to a motor vehicle with a traction battery for storing electric energy for an electric drive motor of a motor vehicle. The invention also relates to a device for transmitting energy to such an electric vehicle.

An electrically operated motor vehicle, here also referred to as electric vehicle, can have an accumulator referred to as traction battery for storing electric energy and for operating the electric drive motor. One possibility to charge the traction battery of a motor vehicle is to connect the battery to an electric energy supply network or to another vehicle-external energy source. When the traction battery is fixedly installed in the motor vehicle the traction battery has to be charged by a user of the motor vehicle. Usually the user is a person, which is not particularly technically trained. For this reason it is sought to configure the charging process as safe and comfortable as possible.

From DE 4236 286 A1 an arrangement for automatic, contactless charging of a traction battery of an electric vehicle is known. The energy is transmitted from the arrangement to the vehicle via an inductive transmitter. For this, the arrangement has a primary coil for generating an alternating field, which coil is arranged on one end of a pivotal arm. For charging the traction battery, the vehicle is parked above the arrangement and the primary coil is brought into proximity of the secondary coil by pivoting the arm, which secondary coil is located in the vehicle. The arrangement poses the problem that the arm and the primary coil may be damaged when the vehicle is moved while the arm is extended.

SUMMARY OF THE INVENTION

In JP 042361-36 102 a device for inductive charging of a traction battery of an electrically operated motor vehicle is described in which a primary coil which is fixedly installed in the ground is magnetically coupled with a secondary coil of the motor vehicle by lowering a soft magnet coil core of the secondary coil from the motor vehicle onto a corresponding coil core of the primary coil. Prior to the lowering the vehicle has to be maneuvered into an appropriate position by means of an automatic control device in order to orient the coil cores relative to each other. A further problem of the device is that the mechanism for moving the coil core of the secondary coil is too large to be used in an automobile. With regard to safety it is problematic that the mechanically moved coil core has to be moved closely past the secondary coil. When the electric insulation of the coil is mechanically compromised, for example because the coil core is contaminated or because the coil core is no longer properly positioned and for that reason rubs against the insulation, this can lead to a short circuit during the charging or to injury to a person as a result of electric shock.

An object of the present invention is to provide a safe and easy to operate device for charging a traction battery of an electrically operated motor vehicle.

The object is solved by a device for transmitting energy to an electric vehicle, including a parking place for parking the electric vehicle, a first rotating disc arranged on a bottom of the parking place, a first drive device constructed to rotate the first rotating disc about a first rotation axis, a positioning device arranged on the first rotating disc; and an output device for outputting the energy, wherein the output device is arranged on the positioning device and movable by the positioning device on the first rotating disc. The object is also solved by a motor vehicle including a traction battery for storing electric energy for an electric drive motor of the motor vehicle, a charging device configured for charging the traction battery, wherein the charging device includes a secondary coil for converting a magnetic field generated outside the motor vehicle into an alternating voltage; and a pivotal conducting device constructed for supplying the alternating magnetic field to the secondary coil. A further solution of the object is given by a method for charging a traction battery including parking the motor vehicle above an energy-output device, orienting the energy output device relative to an energy receiving device of the motor vehicle and in a plane parallel to a bottom of the motor vehicle, lowering a part of the energy receiving device from the bottom of the motor vehicle to the energy delivery device; and coupling the energy receiving device with the energy delivery device and transmitting the energy into the motor vehicle by the coupled energy receiving device and the energy delivery device.

By means of the method according to the invention the motor vehicle can automatically be connected to a vehicle-external energy source. As connection to the energy source serves an energy output device, which is coupled with the energy source, i.e., for example an electric supply network. The energy output device can for example be a socket for plugging in a plug of the vehicle. By plugging in the plug, the motor vehicle is then for example galvanically coupled with an energy supply network. A particular aspect of the invention is that the energy output device is located on the ground of a parking place for the motor vehicle. During the duration of the charging process the energy output device is thus always located below the motor vehicle so that a user of the motor vehicle cannot inadvertently touch or damage the energy output device.

According to the method according to the invention the motor vehicle is placed for charging its traction battery above the energy output device (which is located on the ground). In a next step the energy output device is oriented relative to an energy receiving device of the motor vehicle. In the case that the energy output device is a socket, the corresponding energy receiving device can for example be a plug which is located below the floor panel of the motor vehicle. For orienting the energy output device the latter is moved below the motor vehicle until it has reached an appropriate position for coupling the two devices.

According to the method according to the invention the energy output device is however only oriented in a plane parallel to a bottom of the motor vehicle. In other words the energy output device, i.e., for example the socket, is not moved closer to the bottom of the motor vehicle. This advantageously ensures that the energy output device (located on the ground) is not damaged when the motor vehicle drives off during or after the orienting.

In a further step of the method according to the invention the energy receiving device of the motor vehicle is lowered from the bottom of the motor vehicle to the energy output device. If the motor vehicle is moved during or after this (with lowered energy receiving device) the energy receiving device of this one motor vehicle may be damaged. However, the energy output device in the ground remains functional. Preferably a drive motor of the motor vehicle is deactivated when starting to lower the energy receiving device so that the user of the motor vehicle cannot drive off when the energy receiving device is lowered and thereby damage the energy receiving device.

After the lowering of the energy receiving device the latter is coupled with the energy output device and the energy for the traction battery is transmitted via the coupled devices into the motor vehicle.

Instead of an energy output device which galvanically couples the motor vehicle with the energy source, as it would be the case for example for the described socket, the energy output device can also include an arrangement of capacitor plates which enable a capacitive coupling of a charging-circuit of the motor vehicle with the supply network. As third and preferred possibility an energy output device is provided which includes a primary coil for generating an alternating magnetic field. The energy output device then enables an inductive transmission of the energy which has proven as particularly safe.

The invention also includes a device for transmission of energy to an electric vehicle. In this transmission device a first rotating disc is arranged on a ground of the parking place on which the electric vehicle is placed. This first rotating disc is rotatable about a first rotation axis by means of a first drive device. On the first rotating disc a positioning unit is arranged on which in turn a output device for outputting energy for the electric vehicle is arranged. By means of the positioning unit the output device can be moved on the first rotating disc. This allows reducing the radial distance of the output device relative to the first rotation axis of the first rotating disc.

The device according to the invention can be used in association with the method according to the invention or also independent of the method according to the invention. The device according to the invention has several advantages, which can be realized by using the device within the scope of the described method and also by utilizing the device otherwise. The device can be configured very flat so that the electric vehicle can be driven over it without problems in order to place the electric vehicle on the parking space. In order to adjust the position of the energy output device for the charging process, the energy output device can be moved about the first rotation axis by rotating the first rotating disc on a circular path.

A further advantage of the device of the invention is that it can also be concealed during operation underneath a completely closed protective cover which eliminates the danger that a tire of the motor vehicle or a foot of a person becomes jammed or the interior of the devices contaminated.

But also without a special protective cover the device is already very safe. The first rotating disc is rotated about itself so that by changing its rotational position a hollow space which may be present underneath the rotating disc, in which hollow space for example the drive device of the rotating disc can be accommodated, is only exposed to a minor degree. The electric vehicle can thus drive off at any time without the risk that the tire of the electric vehicle enters the hollow space.

Preferably the rotating disc has a circular shape in whose center the rotation axis is located. In this case the rotating disc covers the whole space to the same degree in every rotational position.

The radial orientation of the output device by means of the positioning device also does not require taking especially complex protective measures in order to cover a shaft or the like which opens up on the first rotating disc during moving the output device. The positioning device can for example consist of a rotatable spindle, which moves a sled on which the energy output device is fastened. The spindle and the sled can then be arranged in a shaft of the rotating disc which is small enough to prevent a tire of the motor vehicle or a foot of a person from sliding into it.

Preferably the output device is only moved on the first rotating disc, i.e., is not lifted off from the rotating disc. In other words the output device is movable by the rotating disc and the positioning device in only one plane parallel to the ground. Thus it never protrudes off the ground to a degree that it could be damaged by a vehicle tire rolling over it or so as to pose an obstacle for a person.

The positioning device is preferably completely arranged inside outer circumference of the first rotating disc. In this case the first rotating disc can be arranged in a recess in the bottom, with the walls of the recess being located so close to the border of the first rotating disc that a gap remains between the wall and the first rotating disc which is smaller then a vehicle tire. This makes the device particularly safe.

The positioning device itself includes preferably also a rotating disc (i.e., a second rotating disc) on which the output device is arranged and which can be rotated about a second rotation axis by means of a second drive device. In other words in this embodiment the first rotating disc carries the second rotating disc. By means of the second rotating disc it can advantageously avoided that when moving the output device on the first rotating disc a hollow space is revealed underneath the positioning device, i.e., underneath the second rotating disc. Preferably a diameter of the second rotating disc is greater then a radius of the first rotating disc. In this case the output device can be positioned at any location in the region of the first rotating disc.

In the case of a device for transmitting energy which is located in the ground (as described above) it should be prevented that the device is damaged when a tire of a vehicle stands on the device while an attempt is made to move the energy output device. In this context an advantageous refinement of the device according to the invention is that the first drive device for the first rotating disc and/or a drive device for the positioning device transmits a drive force from a drive motor via frictional connection to an element to be driven. Rollers made of rubber can be used therefore in the case of the first rotating disc, which rollers are rotated by the first drive motor and push with their outer surface against the first rotating disc. In the case a rotational movement of the first rotating disc is then blocked by a vehicle standing thereupon, the outer surface of the rubber roller slides over the support surface on the first rotating disc as soon as the static friction is overcome. This prevents that something breaks or the drive motor is overheated.

A particularly safe output of energy to the electric vehicle results when the output device includes a primary coil for generating an alternating magnetic field. This allows transmitting energy according to the transformer principle, i.e., by induction into a secondary coil, which is located in the electric vehicle.

Regarding the shape of the output device, an advantage results when an element of the output device which gives off the energy is configured rotation symmetrical. This makes it especially easy to automate the process of orienting of the energy output device and an energy receiving device of a motor vehicle because it is no longer necessary to rotate one of the two devices about its own axis in order to couple the two devices with each other.

Another aspect of the invention relates to a motor vehicle with a traction battery for storing electric energy for an electric drive motor of the motor vehicle. The motor vehicle has a charging device for charging the traction battery. The charging device includes a secondary coil for converting an alternating magnetic field which is generated outside the motor vehicle, as it is for example possible by means of a primary coil of the charging device described above. The alternating magnetic field is converted by the secondary coil into an alternating voltage which can then be used for charging the traction battery with electric energy. In the motor vehicle according to the invention, the charging device has further a pivotal conducting device by means of which the alternating magnetic field can be supplied to the secondary coil. The conducting device includes in other words a highly magnetically permeable material which allows conducting the alternating field. For this a conducting device can for example have a rod made out of a soft magnetic material.

The motor vehicle according to the invention can advantageously be used in connection with the described method according to the invention. The motor vehicle can also be used in combination with the described charging device. However, it is also possible to use the motor vehicle in combination with another charging device and within the scope of another charging method. The conducting device for conducting the magnetic field allows coupling the secondary coil of the motor vehicle with a primary coil of a delivery device and to conduct a magnetic flux with high density via the conducting device. As a result the magnetic flux density is particularly small in the regions adjacent the conducting device which helps avoiding the induction of eddy currents in other regions of the motor vehicle, Over all this leads to an increase of the efficiency of the coupled coils relative to such coils between which only a gap instead of the highly magnetically permeable material is located. In addition, avoiding the air gap results in a decreased magnetic flux density in the interspace between the coils. The penetration surface of the coils required for the induction of a voltage can therefore be much smaller than in coils between which a large air gap is located. Overall this allows providing in the motor vehicle according to the invention a particularly small and lightweight charging device.

The conducting device for conducting the magnetic field is not (in contrast to solutions known from the state-of-the-art) a coil core which is movably supported in the secondary coil. Rather, in the motor vehicle according to the invention the secondary coil and a soft magnetic coil core which at least partially surrounds the secondary coil are preferably fixedly supported in the motor vehicle. This allows advantageously avoiding the risk of damage to live parts of the secondary coil.

The conducting device can instead for example be arranged as pivotal arm underneath the secondary coil on the bottom of the motor vehicle. Such a device has the advantage that it can be configured especially small and can therefore for example also be accommodated in an automobile without for example having to narrow the free space in the interior of the passenger compartment.

The conducting device should include two bodies that are magnetically insulated against each other and which are each made of a highly magnetically permeable material, In the context of the invention a highly magnetically permeable material relates to such material whose permeability number for the magnetic conductivity (magnetic permeability) is greater than 100. The two bodies allow conducting the alternating magnetic field in a closed magnetic circuit from the primary coil over the conducting device to the secondary coil and back again from the secondary coil, i.e., almost exclusively through highly magnetically permeable material. One of the bodies serves as a conducting element towards the secondary coil, the other one conducts the magnetic field from the secondary coil back to the primary coil. A magnetic insulation between the two bodies can be established by means of a material which has a particularly small magnetic conductivity, i.e., for example air or a nonmagnetic plastic.

In connection with an inductive energy transmission from a charging device to an electric vehicle it was observed that a static charge of the vehicle may occur. The static charge can lead to high contact voltages on conducting parts of the vehicle. Therefore, the conducting device preferably includes an electrically conducting return conductor which is configured to galvanically couple the motor vehicle during the charging of the traction battery with the environment of the motor vehicle. This effectively prevents a static charging of the motor vehicle.

BRIEF DESCRIPTION OF THE DRAWING

In the following, the invention his explained in more detail by way of exemplary embodiments. It is shown in.

The examples represent preferred embodiments of the invention.

DETAILED DESCRIPTION OF PREFERRED EMBODIMENTS

Figure 1:
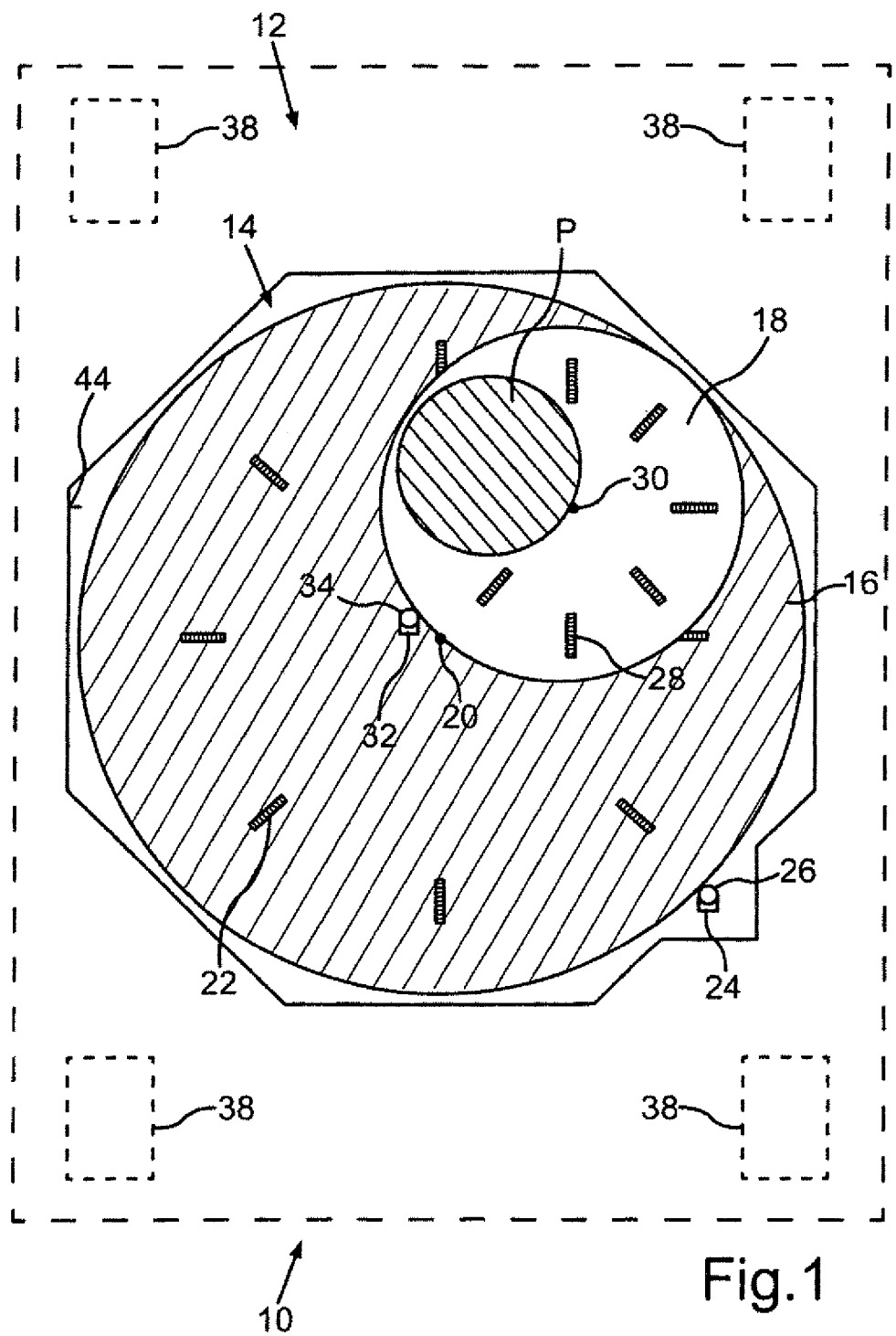
FIG. 1 a schematic representation of a charging device according to one embodiment of the device according to the invention for transmission of energy, FIG. 2 a cross section of a schematic representation of a charging device of FIG. 1 and FIG. 3 a schematic representation of an automobile according to an embodiment of the motor vehicle according to the invention.
Figure 2:
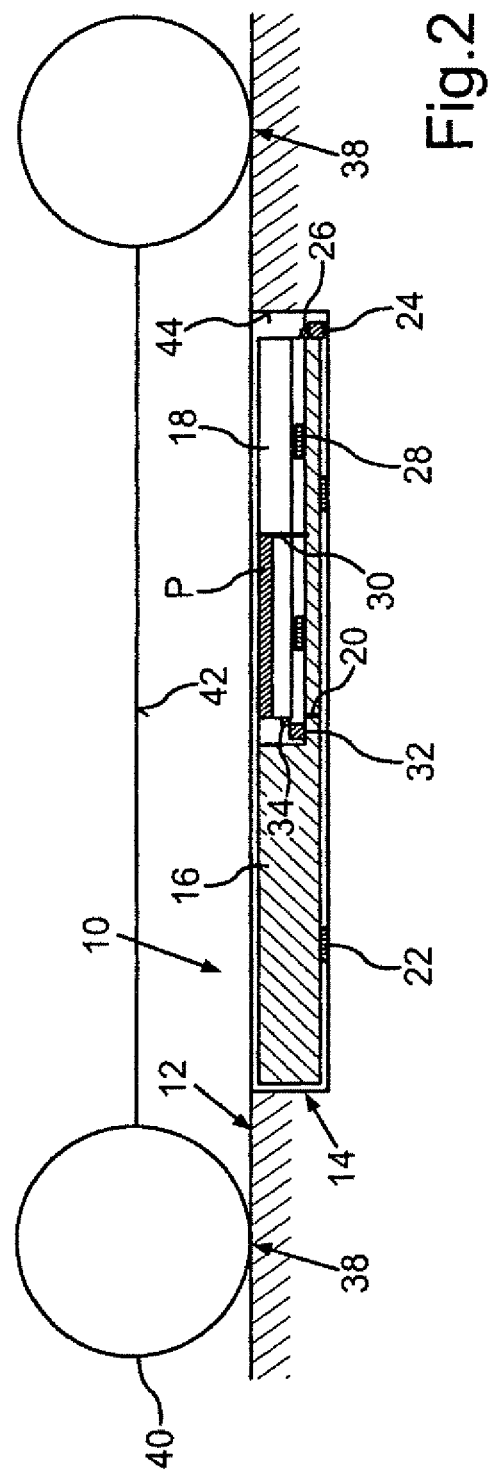

In the example illustrated in FIG. 1 and FIG. 2 a traction battery of an automobile is to be charged. For this the automobile is placed above a charging station 10. The charging station 10 has a shaft 14 in the region of a parking space 12 for an automobile. Located in the shaft 14 is a circular rotating disc 16. On the rotating disc 16 a further circular rotating disc 18 is supported eccentrically. On this further rotating disc an electric coil referred to as primary coil P is eccentrically arranged relative to the rotating disc 18. The primary coil P allows generating the alternating magnetic field by means of which a voltage can be induced in a secondary coil which is located in a charging device for the traction battery in the automobile. Via the alternating field energy can be transmitted from the charging station 10 into the automobile. In order to bring the primary coil P into close proximity to the secondary coil, the primary coil P can be moved on a circular path about a rotation axis 20 of the rotating disc 16 by rotation of the rotating disc 16. By rotating the second rotating disc 18, a radial distance of the primary coil P to the rotation axis 20 is adjusted.

The rotating disc 16 is supported on rollers 22. Only one of the rollers 22 is provided with a reference numeral in FIG. 1 and FIG. 2 for reasons of clarity. For rotating the rotating disc 16, the charging station 10 has a drive motor 24 which can be controlled by a (not shown) control device. On a shaft of the drive motor 24 a roller 26 made of an elastic material, for example a rubber, is fastened. The roller 26 pushes against a border of the rotating disc 16 and can thereby transmit a drive force of the drive motor 24 onto the rotating disc 16.

The smaller rotating disc 18 is supported on rollers 28 and is rotatable on these rollers about a rotating axis 30 by a drive motor 32. Again, only one of the rollers 28 is provided with a reference numeral in FIG. 12 and FIG. 2 for reasons of clarity. The drive motor 32 is also controllable by the control device. A force of the drive motor 32 is transmitted to the rotating disc 18 via a roll 34 which similar to the roll 24 is made of an elastic material.

The primary coil P has a rotation symmetrical shape and is made of multiple windings of an electrically conducting wire. It can also include a soft magnetic coil core which surrounds the winding towards the sides and towards the bottom of the shaft 14. Via (not shown) electrical contacts an alternating current can be introduced into the wire of the primary coil P. The primary coil P then generates the alternating magnetic field in its environment.

In order to be able to transmit the alternating magnetic field to the secondary coil of the charging device with a highest possible efficiency, the primary coil P first has to be brought into a defined position relative to the secondary coil. This is automatically carried out by the control device as described in the following. For this the position of the support surfaces 38 of tires 40 of the automobile on the parking place 12 are indicated in FIG. 1.

The secondary coil of the charging device is located on a bottom 42 of the automobile. For orienting the primary coil P relative to the secondary coil the control device generates signals by which the drive motors 24 and 32 are activated. As a result, the rotating discs 16 and 18 are rotated in the described manner. During movement of the primary coil P the primary coil P generates a week alternating magnetic field. Based on an optimizing algorithm the control device changes the position of the primary coil P until a signal transmitted by the automobile indicates a maximal efficiency of the transmission magnetic energy from the primary coil P to the secondary coil.

In the charging station 10 the primary coil P is only moved horizontally. It is therefore possible at all times to drive over the charging station 10 with the automobile and in particular over the rotating discs 16 and 18 and the primary coil P without causing damage to components of the charging station 10. Vice versa at no point in time does a component of the charging station 10 protrude out of the shaft 14 to a degree that one of the tires 40 or another part of the automobile can be damaged. In addition independent of the rotational position of the rotating discs 16, 18, the distances between the wall 44 of the shaft 14 and the rotating discs 16 and 18 are never so great that one of the tires 40 may slide into the shaft 14. It is also always for a person safe to walk over the charging station 10 without sliding into the shaft 14 with a foot and thereby spraining the food. The rotating disc 16 can also be accommodated in a flat pedestal which rests on the bottom of the parking place. In this case it is not necessary to provide a shaft such as the shaft 14. The pedestal can be configured flat enough so as to be able to drive over it with a vehicle.

In the case that the tire 40 rests on one of the rotating discs 16, 18 and a rotational movement of the rotating disc 16 or both rotating discs 16, 18 is blocked, this cannot lead to the situation that one of the electric motors 24 or 32 is overcharged when it is activated by the control device. The pressing force with which the rollers 26 and 34 press against the respective rotating disc 16, 18 is of a magnitude so that the rollers 26 and 34 slide over the surface of the disc border when the rotating disc is blocked. In the case where a greater force is to be transmitted to the rotating discs it can be provided instead of the rollers 26, 34 that the electric motors are each coupled with the respective rotating disc via a gear or a spindle.

Due to the fact that the rotating disc 16 is supported on multiple rollers 22 it rests on a bottom of the shaft 14 with a relatively great surface. Therefore also very heavy vehicles such as trucks can roll over the charging station 10 without the bottom of the shaft 14 becoming lowered with time. Instead of the rollers 22 also sliding bearings, rolls or the like can be used. The same applies also for the rotating disc 18.

In the example illustrated in FIG. 1 and FIG. 2 the diameter of the rotating disc 18 corresponds to the radius of the rotating disc 16. The rotating disc 18 can also have a greater diameter. In this case the primary coil P can also be positioned above the rotation axis 20.

FIG. 3 shows automobile 46 which is parked above a charging device 48. The charging device 48 can for example be the charging station 10 described in connection with FIG. 1 and FIG. 2.

On a bottom panel 50 of the automobile 46 a coil 52 is located which is embedded in a soft magnetic coil core 54. The coil 52 and the coil core 54 are fixedly connected with the bottom panel 50. The coil 52 is a secondary coil into which a voltage far charging a traction battery of the automobile 46 can be induced by means of an alternating magnetic field.

In the example shown in FIG. 3 the alternating magnetic field is generated by a primary coil 56 of the charging device 48. Prior to the charging the primary coil 56 was oriented horizontally by drive motors (not shown in FIG. 3), i.e., parallel to a bottom 58 on which the charging device 48 is fastened relative to the position of the secondary coil 52.

The coil core 54 and the coil core of the primary coil 56 are magnetically coupled with each other via a pivot arm 58. Located in the pivot arm 58 are two (not further shown) soft magnetic rods which are made of a highly magnetically permeable material. The two rods, the coil core 54, and the coil core of the primary coil 56 form a closed magnetic circuit via which the alternating magnetic field of the primary coil 56 is conducted through the coil 54 without a part of the conducted alternating field being located in an air gap with a width which would significantly adversely affect the efficiency.

When orienting the primary coil 56 relative to the coil 52 a pivot path 60 of an end 62 of the pivot arm 58 is taken into account by the control device of the charging device 48 which pivot path makes it necessary that the two coils 42, 56 have to be oriented offset relative to each other instead of directly above each other in order for the end 62 contacting the primary coil 56 after lowering the pivot arm 58 and a maximum efficiency is achieved during the transmission of the alternating magnetic field.

The primary coil 56 and the end 62 of the pivot arm 58 are each configured rotation symmetrical. For this reason, a good magnetic coupling between the end 62 and the primary coil 56 results even when the automobile 46 is parked at an angle over the charging device 48. The shape of the pivot arm 58 and the end 62 can be standardized. The type of shape can then for example be taken into account by the control device when orienting the primary coil 56.

Also located in the pivot arm 58 is an electric conducting device by which the automobile 56 is coupled during the charging with a ground cable of the charging device 48. The bottom panel 50 and other metallic parts of the automobile 46 can thereby not be statically charged during the energy transmission.

During a drive of the automobile 46 the pivot arm 58 is brought into a transport position 64. For this purpose the end 62 of the pivot arm 58 is moved towards a rear of the automobile 46 along a pivot path 60 on a hinge 66 on which the pivot arm 58 is pivotally supported by means of a drive device. A position of the pivot arm 58 in the transport position 66 is shown in dashed lines in FIG. 3. Due to the fact that the pivot arm 58 can be moved towards the rear no damage to the automobile is caused when a driver inadvertently drives the automobile 46 forward while the pivot arm 58 is not yet in the transport position 64.

It is also conceivable that the pivot arm 58 is lowered during a drive of the automobile 46 and energy is received by the pivot arm 58 from a longitudinally shaped primary coil. Roads with such primary coils which allow charging of the traction battery during a drive are also referred to as "electrified roads".

The examples show how energy can be transmitted with a high efficiency from a charging device to a vehicle. For this only a relatively lightweight and small secondary coil has to be provided in the vehicle. The charging device due to a low magnetic flux density is safe in the freely accessible region between the call and charging device. A static charging of the vehicle is also avoided.

The invention claimed is:

1. A device for transmitting energy to an electric vehicle, comprising:
   a parking place for parking the electric vehicle;
   a first rotating disc arranged on a bottom of the parking place;
   a first drive device constructed to rotate the first rotating disc about a first rotation axis;
   a positioning device arranged on the first rotating disc; and
   an output device for outputting the energy, said output device arranged on the positioning device and movable by the positioning device on the first rotating disc.

2. The device of claim 1, wherein the positioning device is completely arranged within an outer circumference of the first rotating disc.

3. The device of claim 1, further comprising a second drive device, said positioning device comprising a second rotating disk, said output device being arranged on the second rotating disc and rotatable about a rotation axis of the second rotating disc by the second drive device, and wherein a diameter of the second rotating disc is greater than a radius of the first rotating disk.

4. The device of claim 3, wherein the first drive device for the first rotating disc and/or the drive device for the positioning device are constructed to transmit a respective drive force respectively generated by the first and second drive device onto the first and second rotating disc via frictional coupling.

5. The device of claim 1, wherein the output device is movable exclusively in a plane parallel to the bottom of the parking place by the first rotating disc and the positioning device.

6. The device of claim 1, wherein the output device includes a primary coil for generating an alternating magnetic field.

7. The device of claim 6, wherein the primary coil is configured rotation symmetrical.

* * * * *

UNITED STATES PATENT AND TRADEMARK OFFICE
CERTIFICATE OF CORRECTION

| | | |
|---|---|---|
| PATENT NO. | : 8,933,663 B2 | Page 1 of 1 |
| APPLICATION NO. | : 14/234082 | |
| DATED | : January 13, 2015 | |
| INVENTOR(S) | : Björn Elias and Reinhard Peer | |

It is certified that error appears in the above-identified patent and that said Letters Patent is hereby corrected as shown below:

On the title page, item [54] and in the specification, column 1, correct the title of the application to read:

-- METHOD FOR CHARGING A TRACTION BATTERY, DEVICE FOR TRANSMITTING ENERGY TO AN ELECTRIC VEHICLE AND MOTOR VEHICLE --

Signed and Sealed this
Seventh Day of July, 2015

Michelle K. Lee
*Director of the United States Patent and Trademark Office*